US007619205B2

(12) United States Patent
Mori et al.

(10) Patent No.: US 7,619,205 B2
(45) Date of Patent: Nov. 17, 2009

(54) IMAGE FORMING APPARATUS HAVING PHOTO SENSORS CAPABLE OF DETECTING OBJECTS OF DIFFERENT WIDTHS USING PHOTOCOUPLERS OF THE SAME CONFIGURATION

(75) Inventors: Shinya Mori, Shizuoka-ken (JP); Kazushige Morihara, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 511 days.

(21) Appl. No.: 11/460,223

(22) Filed: Jul. 26, 2006

(65) Prior Publication Data

US 2008/0025760 A1 Jan. 31, 2008

(51) Int. Cl.
*G01J 1/04* (2006.01)
*G01J 1/42* (2006.01)
*G01J 5/08* (2006.01)

(52) U.S. Cl. ................................. 250/227.11; 250/551

(58) Field of Classification Search ............ 250/227.11, 250/208.1, 214.1, 214 R, 551
See application file for complete search history.

(56) References Cited

U.S. PATENT DOCUMENTS 5,381,167 A * 1/1995 Fujii et al. .................. 347/116
6,995,356 B2 * 2/2006 Chong et al. ........... 250/231.14

FOREIGN PATENT DOCUMENTS

JP 06-104479 4/1994
JP 2000-285278 10/2000

* cited by examiner

*Primary Examiner*—Thanh X Luu
*Assistant Examiner*—Francis M Legasse, Jr.
(74) *Attorney, Agent, or Firm*—Patterson & Sheridan, LLP

(57) ABSTRACT

A photo sensor of the invention includes a photo coupler having a light emitting element and a light receiving element arranged and disposed to be spaced from each other by a specified interval, and a prism capable of being coupled to the photo coupler, having an optical path to guide a light from the light emitting element to the light receiving element, and provided with a slit in the optical path, through which an object to be detected can pass, plural prisms different in width of the slit are provided, and the plural prisms and the photo couplers are combined to enable detection of objects to be detected which are different in detection distance. The photo sensor can be used for an image forming apparatus or the like.

4 Claims, 6 Drawing Sheets

84
90
91
92
93
94
95
d0
57
77
77a
77b
77c
77d
77e
77f
d1
58
78
78a
78b
78c
78d
78e
78f
d2

IMAGE FORMING APPARATUS HAVING PHOTO SENSORS CAPABLE OF DETECTING OBJECTS OF DIFFERENT WIDTHS USING PHOTOCOUPLERS OF THE SAME CONFIGURATION

BACKGROUND OF THE INVENTION

1. Field of the Invention

The present invention relates to an image forming apparatus such as an MFP (Multi-Function Peripherals) as a digital compound machine, a copier or a printer. Besides, the invention relates to a photo sensor usable for an image forming apparatus or the like.

2. Description of the Related Art

Heretofore, an image forming apparatus such as an MFP includes a color printer unit having a photoconductive drum, a developing device, a transfer device and the like, and a sheet is transported to the color printer unit, and a color image is formed on the sheet.

Besides, the image forming apparatus includes plural detection means. For example, the transport of a sheet is detected so that the number of sheets is counted, or sheet clogging (jamming) in the middle of the transport or the like can be detected. Besides, in addition to the transport system, for example, in the color printer unit, the mounting of a toner cartridge is detected, or the rotation state of a rotation part is detected, and the operations of respective parts are controlled by using the detection result.

As the detection means, a photo sensor is widely used. The photo sensor includes a light emitting element and a light receiving element, a slit is provided in an optical path from the light emitting element to the light receiving element, and an object to be detected is made to pass through this slit, so that the presence/absence of the object to be detected is detected.

In a conventional photo sensor, since the thicknesses of the objects to be detected are different from each other, it is necessary to use the photo sensors suitable for the respective thicknesses, and when a space occupied by the photo sensors becomes large, it becomes difficult to arrange them in a limited space. Besides, since the photo sensors used are different in size and interval between terminals, when they are mounted on a printed board, it is necessary to design a print wiring circuit pattern according to the shapes of the photo sensors. Thus, in an apparatus using plural photo sensors different in kind, there is a defect that a print wiring pattern structure becomes complicated.

JP-A-6-104479 discloses a photo sensor including a light emitting element and a light receiving element. In this example, two light guides are disposed to be spaced from each other by a specified interval and to be opposite to each other, a light from the light emitting element is guided to the second light guide through the first light guide, and the light received by the second light guide is received by the light receiving element. Ends of the first and the second light guides are prism-shaped, an object to be detected is made to pass through between the first and the second light guides to shade the light, and the presence/absence of the object to be detected is detected.

However, in this example, the thickness of the object to be detected which is detected by the sensor is constant, and in the case where objects to be detected which are different in thickness or size are detected, it is necessary to prepare photo sensors different in the interval between the light emitting element and the light receiving element.

JP-A-2000-285278 discloses an example in which a sensor is used to monitor the transport of a sheet. In this example, it is an object to detect skewing of the sheet, a light emitting element and a light receiving element are arranged in parallel to the transport direction of the sheet, and the light from the light emitting element is refracted plural times by a reflecting mirror and is guided to the light receiving element. In the case where the sheet blocks the reflecting optical path, it is judged that the sheet skews.

Also in this example, there is no disclosure about a case where plural objects to be detected which are different in thickness or size are detected.

The invention provides a photo sensor in which even in the case where the thicknesses or sizes of objects to be detected are different from each other, an interval between a light emitting element and a light receiving element is constant. Besides, the invention provides an image forming apparatus using plural photo sensors.

DETAILED DESCRIPTION OF THE INVENTION

Throughout this description, the embodiments and examples shown should be considered as exemplars, rather than limitations on the apparatus of the present invention.

Hereinafter, embodiments of the invention will be described in detail with reference to the drawings.

Figure 1:
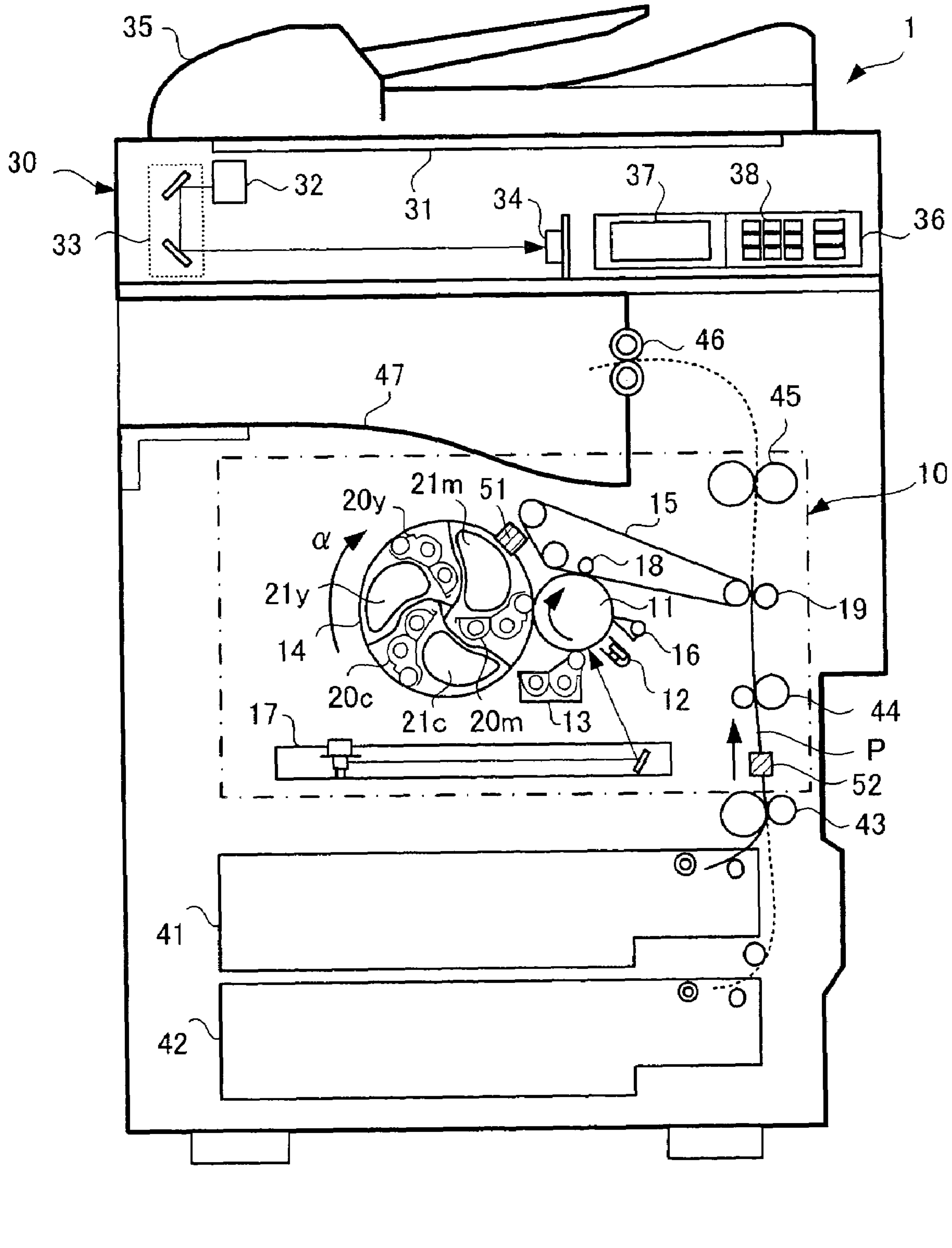
FIG. 1 is a structural view schematically showing the whole structure of an image forming apparatus of an embodiment of the invention.

FIG. 1 is a structural view schematically showing the whole structure of an image forming apparatus of an embodiment of the invention. Incidentally, in FIG. 1, although a description will be made while using an MFP (Multi-Function Peripherals) as an example, the invention can also be applied to a copier, a printer or the like.

In FIG. 1, 1 denotes an image forming apparatus, and a printer unit 10 is provided at the center of the apparatus. The printer unit 10 includes a photoconductive drum 11 to hold image information to be printed. A charging device 12, a developing device 13 for black, which develops an electrostatic latent image formed on the photoconductive drum 11, and a developing device 14 to develop an electrostatic latent image for color are provided around the photoconductive drum 11.

Further, an intermediate transfer belt 15 and a cleaning/charge removal device 16 are disposed around the photoconductive drum 11. Besides, an exposure device 17 is disposed in the vicinity of the photoconductive drum 11, and a laser beam is irradiated to the photoconductive drum 11. The light intensity of the laser beam is modulated correspondingly to the image information to be printed.

The color developing device 14 includes developing units of Y (yellow), C (cyan) and M (magenta) and is of a revolver type. The developing units of Y, C and M respectively include development machines 20*y*, 20*c* and 20*m* and toner cartridges 21*y*, 21*c* and 21*m*, and hold a developer in which a toner and a carrier are mixed at a specified ratio.

The developing units of Y, M and C of the developing device 14 are disposed to be rotatable in an arrow α direction around the center axis, and are successively rotated to a development position opposite to the photoconductive drum 11 according to the request of image output. In the case where the image to be printed is the color image, image data of respective color components formed on the photoconductive drum 11 are developed by the developing unit of Y, C and M, are successively transferred onto the transfer belt 15 and are superimposed.

An intermediate transfer device 18 to transfer the toner image developed on the photoconductive drum 11 to the transfer belt 15 is provided at the inside of the intermediate transfer belt 15. Further, a transfer device 19 to transfer the toner image transferred on the transfer belt 15 to a sheet P is provided on a transport path of the sheet P.

Besides, a scanner 30 is provided at an upper part of the image forming apparatus 1. The scanner 30 reads a document placed on a document mounting table 31, and includes a light source 32 to irradiate a light to the document placed on the document mounting table 31, a reflecting mirror 33 to reflect the light reflected from the document, and a light receiving unit 34 to receive the light reflected from the reflecting mirror 33.

Besides, an automatic document feeder (ADF) 35 and an operation panel 36 are provided at an upper part of the document mounting table 31. The operation panel 36 includes a display unit 37 and an operation unit 38.

Further, paper feed cassettes 41 and 42 of plural stages are provided at a lower part of the image forming apparatus 1, and the sheet P in these paper feed cassettes 41 and 42 is transported upward by a transport roller 43, a register roller 44 and a fixing roller 45, and is discharged onto a paper discharge tray 47 by a paper discharge roller 46.

At the time of image formation, the light is irradiated to the document on the document mounting table 31 from the light source 32, the light reflected from the document is incident on the light receiving unit 34 through the reflecting mirror 33, and the document image is read. Based on the information read by the light receiving unit 34, the laser beam is outputted from the exposure device 17, and the surface of the photoconductive drum 11 is irradiated with this laser beam. By this, a latent image corresponding to the intensity of the exposure light is formed on the photoconductive drum 11.

The latent image formed on the photoconductive drum 11 is selectively supplied with a toner of a corresponding color from the black developing device 13 or the color developing device 14, so that it is visualized as a toner image.

The toner image on the photoconductive drum 11 is transported to the intermediate transfer position by the rotation of the photoconductive drum 11, and is transferred to the transfer belt 15 by an intermediate transfer voltage provided from the intermediate transfer device 18.

The toner image transferred to the transfer belt 15 is transported to a transfer area opposite to the transfer device 19 by the movement of the belt surface of the transfer belt 15, and is transferred to the sheet P supplied at a specified timing. A transfer bias voltage is supplied from the transfer device 19.

The sheet P on which the toner image has been transferred is guided to the fixing device 45, and the toner image is fixed to the sheet P by heat supplied from the fixing device 45. The sheet on which the image has been fixed by the fixing device 45 is successively transported to the paper discharge tray 47 by the roller 46.

In the image forming apparatus 1 as stated above, in order to detect the mounting of the toner cartridges 21*y*, 21*c* and 21*m* and to detect the rotation state of a rotator such as the developing units 14*y*, 14*c* and 14*m*, a photo sensor 51 is disposed. Besides, a photo sensor 52 is disposed in the transport path of the sheet P.

The photo sensors 51 and 52 constitute a detection unit to detect the movement of a moving object (sheet to be transported, rotation of the toner cartridge, etc.) relating to an image forming process, and the image forming apparatus 1 is provided with a control unit (not shown) to control the operation of the respective units in the image forming apparatus 1 based on the detection result of the photo sensors 51 and 52. The control unit includes a CPU, and in the case where a jam occurs from the detection result of the photo sensor 52, a message is displayed on the display unit 37 or the control rotation of the developing device 14 is performed.

Figure 2A:
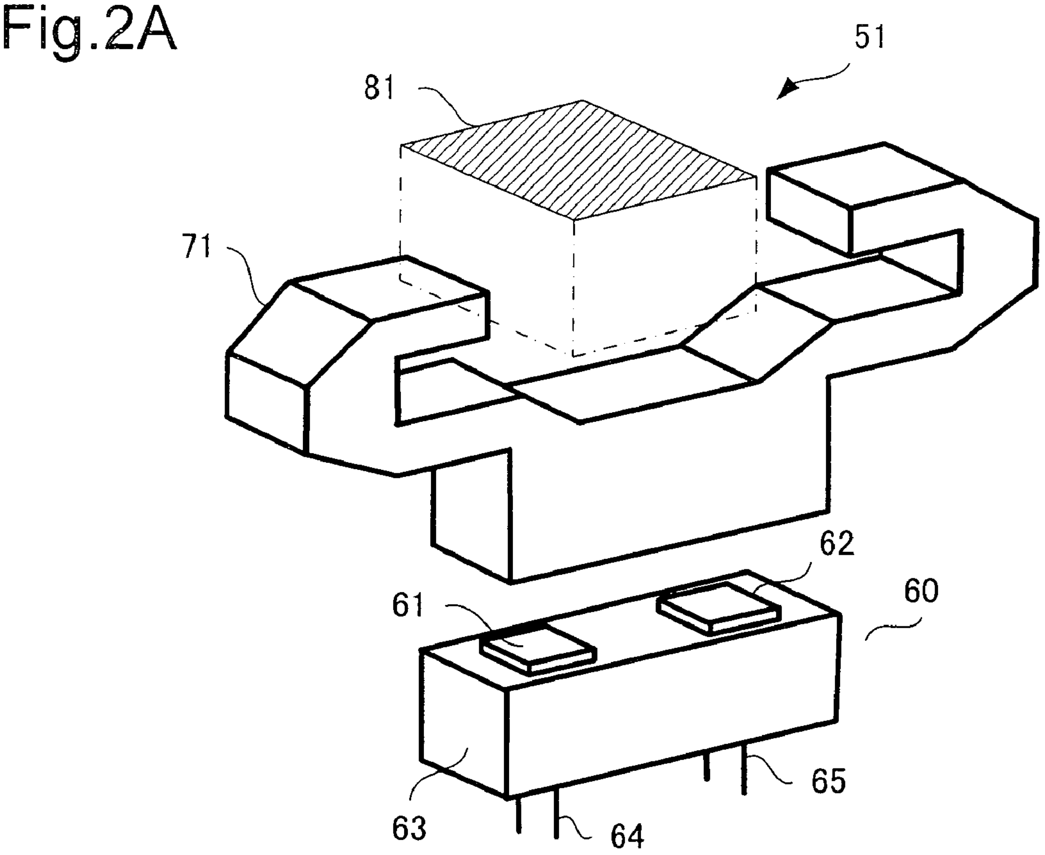
FIGS. 2A and 2B are perspective views showing an embodiment of a photo sensor of the invention.
Figure 2B:
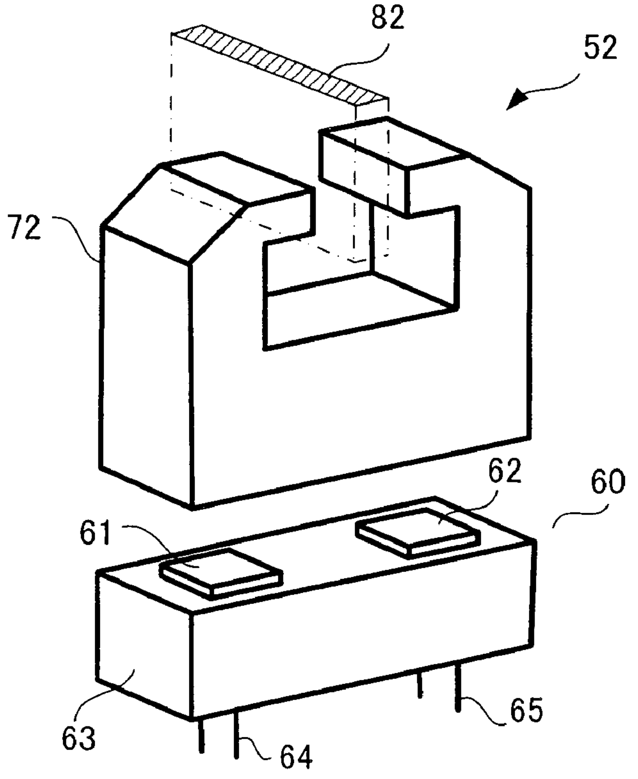
Figure 3A:
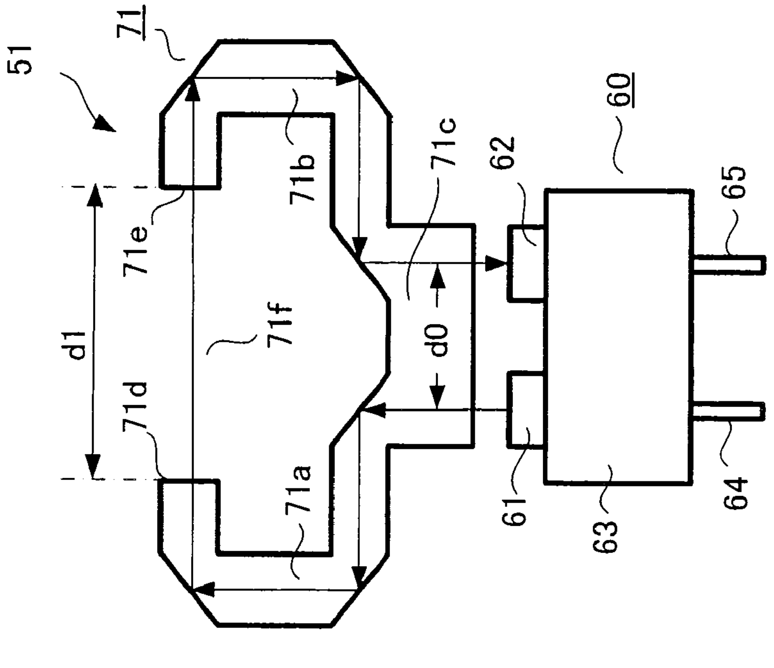
FIGS. 3A, 3B and 3C are front views showing the embodiment of the photo sensor of the invention and a modified example.
Figure 3B:
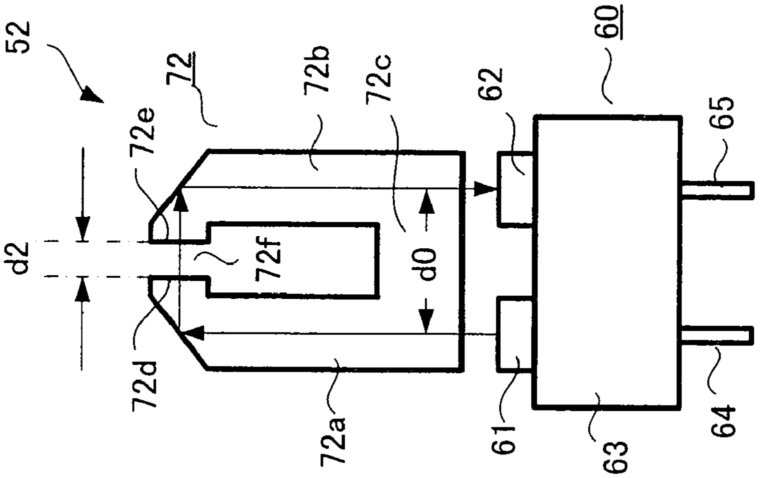

FIG. 2A and FIG. 2B are perspective views showing an embodiment of a photo sensor of the invention, and FIG. 3A and FIG. 3B are front views.

A photo sensor 51 of FIG. 2A and FIG. 3A includes a photo coupler 60 and a prism 71. The photo coupler 60 includes a light emitting element 61, a light receiving element 62, and a light-shielding case 63. The light emitting element 61 and the light receiving element 62 are spaced from each other by a specific interval d0 and are attached in the case 63, a light emitting surface of the light emitting element 61 and a light receiving surface of the light receiving element 62 face one surface of the case 63, and a terminal 64 of the light emitting element 61 and a terminal 65 of the light receiving element 62 protrude from the other surface.

On the other hand, the prism 71 includes a pair of light guides 71*a* and 71*b* and a main body 71*c* to couple the light guides 71*a* and 71*b*, and the main body 71*c* is opposite to the light emitting element 61 and the light receiving element 62. The prism 71 can be coupled to the photo coupler 60, the light from the light emitting element 61 is reflected plural times at the inner surface of the light guide 71*a*, is guided to an end face 71*d*, and is incident on an end face 71*e* of the light guide 71*b*. Besides, in the light guide 71*b*, the light received at the end face 71*e* is reflected plural times at the inner surface of the light guide 71*b* and is guided to the light receiving element 62.

A width d1 of a slit 71*f* formed between the end face 71*d* of the light guide 71*a* and the end face 71*e* of the light guide 71*b* is set so that an object 81 to be detected can pass through. In this case, the width d1 of the slit 71*f* is set to be wider than the interval d0.

A photo sensor 52 of FIG. 2B and FIG. 3B includes a photo coupler 60 and a prism 72. The photo coupler 60 is the same as that of FIG. 2A and FIG. 3A, and the prism 72 is different in shape.

The prism 72 includes a pair of light guides 72*a* and 72*b* and a main body 72*c* to couple the light guides 72*a* and 72*b*. The prism 72 can be coupled to the photo coupler 60, and a light from a light emitting element 61 is reflected once at the inner surface of the light guide 72*a* and is guided to an end face 72*d*, and is incident on an end face 72*e* of the light guide 72*b*.

Besides, in the light guide 72*b*, the light received at the end face 72*e* is once reflected at the inner surface of the light guide 72*b*, and is then immediately guided to a light receiving element 62. A width d2 of a slit 72*f* formed between the end face 72*d* and the end face 72*e* is set so that an object 82 to be detected can pass through. In this case, the width d2 of the slit 72*f* is set to be narrower than the interval d0.

FIG. 3A and FIG. 3B show the optical paths of the photo sensors 51 and 52 by arrows. The photo sensor 51 of FIG. 3A has such structure that the light emitted from the light emitting element 61 is once refracted toward the outer direction by the light guide 71*a* and is guided to the end face 71*d*, and the light guide 71*b* has also the symmetric structure. Thus, the length of the optical path is long and the width d1 of the slit 71*f* can be set to be wide. Accordingly, it is suitable for detecting the object 81 to be detected which has a wide width.

Besides, the photo coupler 72 of FIG. 3B has such structure that the light emitted from the light emitting element 61 is directly guided upward, is reflected only once, and goes out from the end face 72*d*, and the light guide 72*b* has also the symmetric structure. Thus, the length of the optical path is short, and the width d2 of the slit 72*f* can also be made narrow. Accordingly, it is suitable for detection of the object 82 to be detected which has a narrow width.

The prisms 71 and 72 form loop-shaped optical paths from the light emitting element 61 to the light receiving element 62, and the loop diameter of the prism 71 is longer than the interval d0 in the lateral direction. Besides, the loop diameter of the prism 72 is shorter than the loop diameter of the prism 71.

Figure 3C:
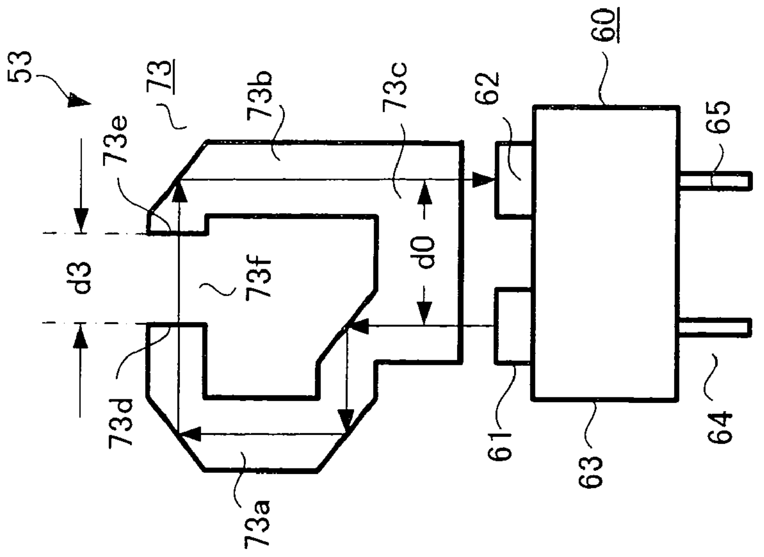

A photo sensor 53 of FIG. 3C is an example of using a prism 73 having a slit width d3 of an intermediate width (d1>d3>d2). The prism 73 includes a light guide 73*a* and a light guide 73*b*, a light emitted from a light emitting element 61 is once refracted toward the outer direction by the light guide 73*a*, is reflected plural times at the inner surface of the light guide 73*a*, and is guided to an end face 73*d*.

The light guide 73*b* has such a structure that the light received at an end face 73*e* is once reflected at the inner surface, and then is immediately guided to a light receiving element 62. Accordingly, the length of the optical path is also an intermediate length, and the width d3 of a slit 73*f* formed between the end face 73*d* of the light guide 73*a* and the end face 73*e* of the light guide 73*b* is the intermediate width between those of FIG. 3A and FIG. 3B.

Although the photo sensors 51, 52 and 53 are respectively used for detection of objects to be detected which are different from each other in thickness or size, the photo coupler 60 with the same shape can be used.

Figure 4A:
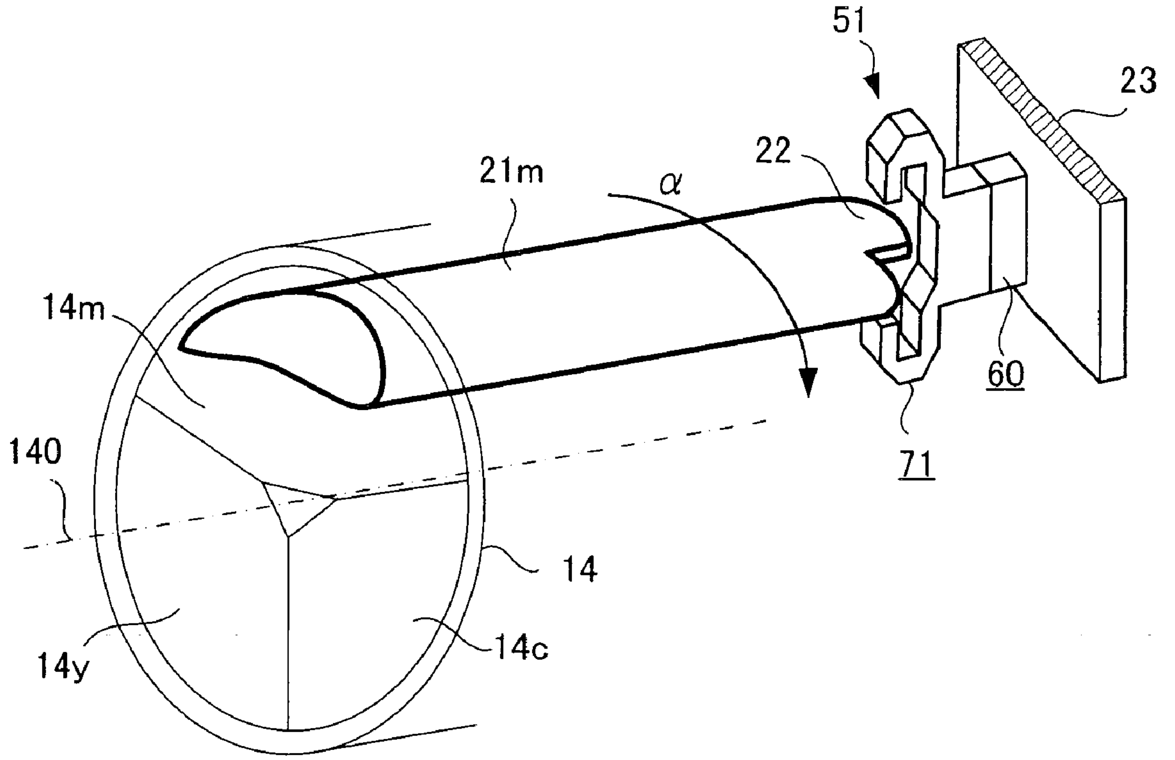
FIGS. 4A and 4B are perspective views showing an example in which the photo sensor of the invention is applied to an image forming apparatus.

FIG. 4A is a view showing an example in which the foregoing photo sensors 51 and 52 are applied to the image forming apparatus 1. In FIG. 4A, 14 schematically denotes a color developing device which includes developing units 14*y*, 14*c* and 14*m* of yellow, cyan and magenta, and toner cartridges 21*y*, 21*c* and 21*m* are mounted to the respective developing units 14*y*, 14*c* and 14*m*. FIG. 4A typically shows the magenta toner cartridge 21*m*, and a wing-shaped projection 22 is provided at an end face of the toner cartridge 21*m* in an insertion direction.

On the other hand, the photo sensor 51 shown in FIG. 2A and FIG. 3A is attached to a printed board 23 at the side of an image forming apparatus main body, and when the toner cartridge 21*m* is mounted, the projection 22 is made to be capable of passing through the slit 71*f* of the photo sensor 51. When the color developing device 14 is rotated in the α direction around a rotation axis 140, the projection 22 of the toner cartridge 21*m* is detected by the photo sensor 51, and accordingly, the mounting state of the toner cartridge 21*m* is detected, and the rotation state can be detected.

Since similar projections 22 are provided on the cyan and yellow toner cartridges 21*c* and 21*y*, the photo sensor 51 can detect the mounting states of the three color toner cartridges 21*y*, 21*c* and 21*m* and the rotation states.

Figure 4B:
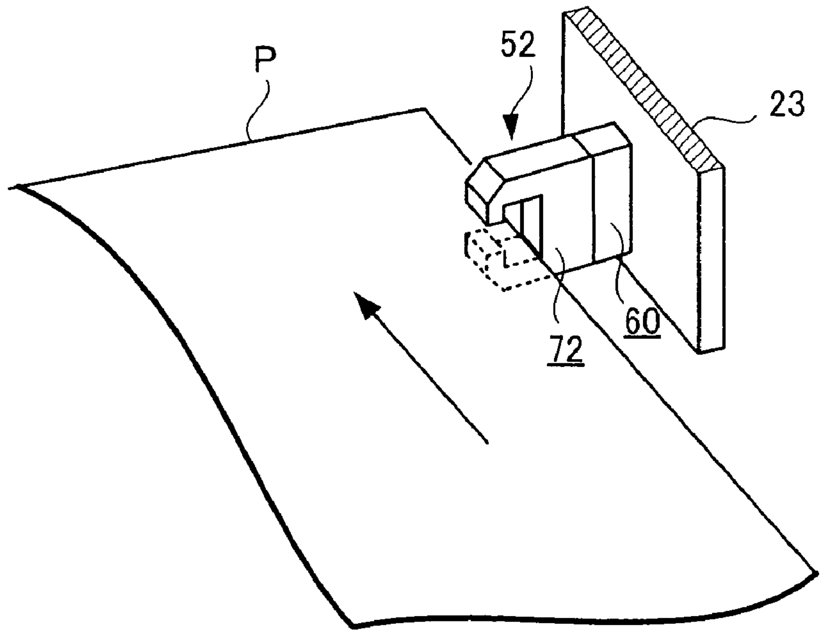

FIG. 4B is a view in which the foregoing photo sensor 52 is disposed in the transport path of the sheet P of the image forming apparatus 1. Since the thickness of the sheet P is thin, the photo sensor 52 with the small slit width is used. According to whether the end of the sheet P passes through the slit 72F of the photo sensor 52, it is possible to detect whether or not the sheet is transported. Besides, when it stays in the slit 72*f* for a long time, the transport of the sheet P is stopped, and detection of a jam can also be performed.

Even in the case where the detection of the toner cartridge or the detection of the sheet P is performed, the photo couplers 60 of the photo sensors 51 and 52 have the same structure, and accordingly, wiring circuit patterns at the time when the photo couplers 51 and 52 are mounted on the printed board 23 can be designed with the same pattern. Accordingly, the pattern design of the print wiring becomes easy.

Figure 5C:
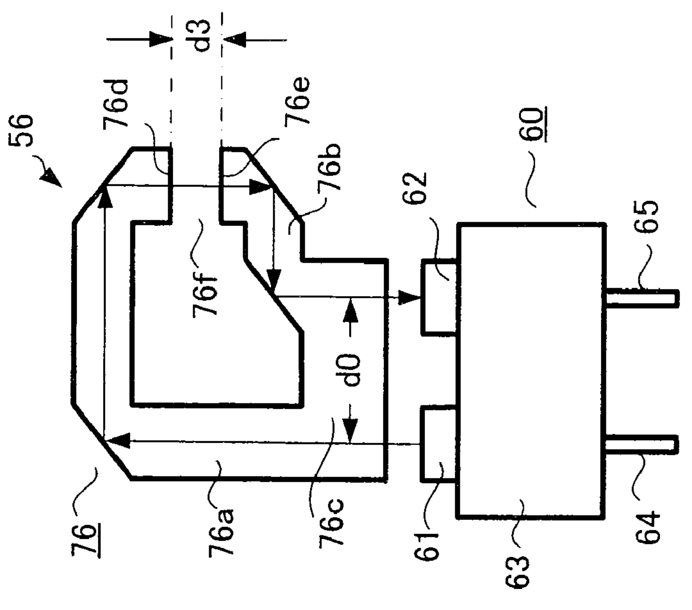
FIGS. 5A, 5B and 5C are front views showing another embodiment of a photo sensor of the invention.

Next, another embodiment of a photo sensor of the invention will be described with reference to FIGS. 5A, 5B and 5C. In FIGS. 3A, 3B and 3C, although the description has been given to the examples in which the slits 71*f*, 72*f* and 73*f* are formed in the vertical direction, FIGS. 5A, 5B and 5C show examples in which slits are formed in the horizontal direction.

Figure 5B:
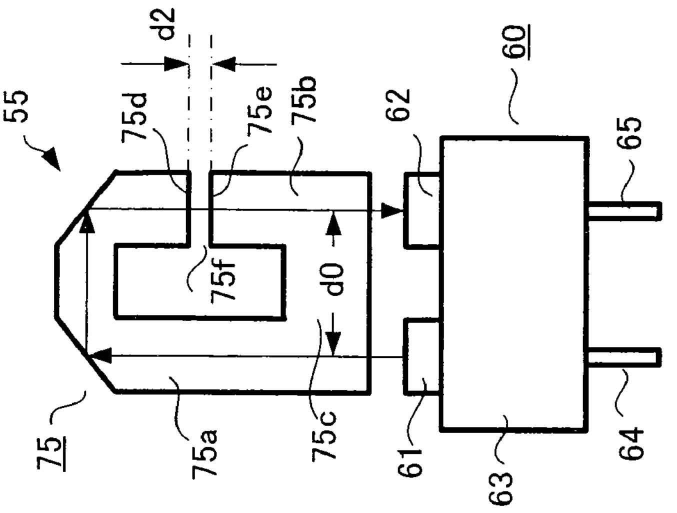
Figure 5A:
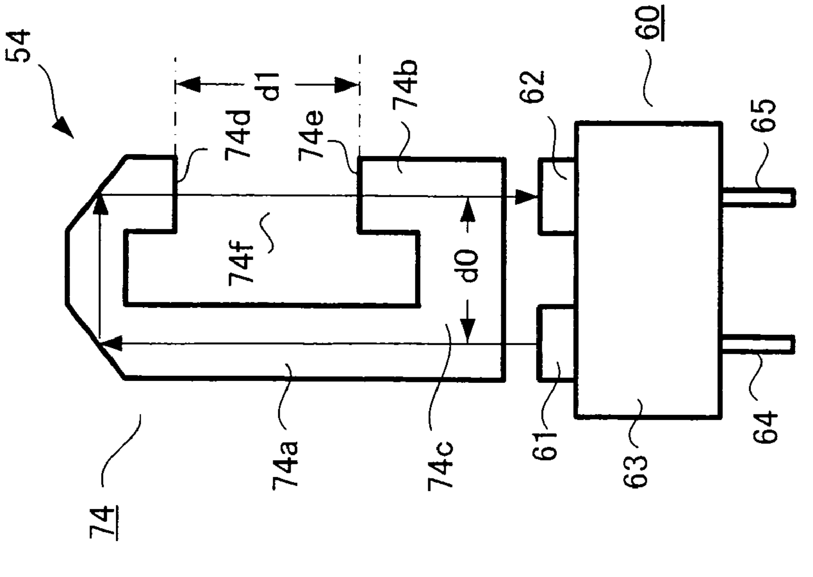

A photo sensor 54 of FIG. 5A includes a photo coupler 60 and a prism 74. The photo coupler 60 used is the same as that of FIG. 2A, and the prism 74 is different in shape.

The prism 74 includes a pair of light guides 74*a* and 74*b* and a main body 74*c* to couple the light guides 74*a* and 74*b*, and has a "C"-type shape as a whole. In the prism 74, a light from a light emitting element 61 is reflected twice in the light guide 74*a* and is guided to an end face 74*d*, and is incident on an end face 74*e* of the light guide 72*b* in the vertical direction. Besides, the light guide 74*b* immediately guides the light received at the end face 74*e* to a light receiving element 62. A width d1 of a slit 74*f* formed between the end face 74*d* and the end face 74*e* is set to be relatively wide. In the case of FIG. 5A, the width d1 of the slit 74*f* is set to be wider than an interval d0 between the light emitting element 61 and the light receiving element 62, and the length of the optical path is long.

A photo sensor 55 of FIG. 5B includes a photo coupler 60 and a prism 75. The prism 75 includes a pair of light guides 75*a* and 75*b* and a main body 75*c* to couple the light guides 75*a* and 75*b*, and has a "C"-type shape as a whole. The prism 75 is lower than the prism 74, a width d2 of a slit 75*f* formed between an end face 75*d* of the light guide 75*a* and an end face 75*e* of the light guide 75*b* is set to be narrow, and the width d2 of the slit 75*f* is set to be narrower than an interval d0. Besides, the length of the optical path is also short.

The prisms 74 and 75 form loop-shaped optical paths from the light emitting element 61 to the light receiving element 62, and the loop diameter of the prism 74 is longer than the interval d0 in the longitudinal direction. Besides, the loop diameter of the prism 75 is shorter than the loop diameter of the prism 74.

A photo sensor 56 of FIG. 5C shows a modified example. The prisms 74 and 75 of FIGS. 5A and 5B have the slits of arbitrary widths by changing the height, whereas the photo sensor 56 detects an object to be detected at a position shifted in the lateral direction.

The photo sensor 56 includes a photo coupler 60 and a prism 76, the prism 76 includes light guides 76*a* and 76*b* and a main body 76*c* to couple the light guides 76*a* and 76*b*, and has a "C"-type shape as a whole. In this case, the light guide 76*b* extends in the lateral direction, and a slit 76*f* formed between an end face 76*d* of the light guide 76*a* and an end face 76*e* of the light guide 76*b* is slightly shifted from a position of the photo coupler 60 in the horizontal direction. In the light guide 76*b*, the light received at the end face 76*e* is refracted twice and is guided to a light receiving element 62.

Figures 6A, 6B, 6C:
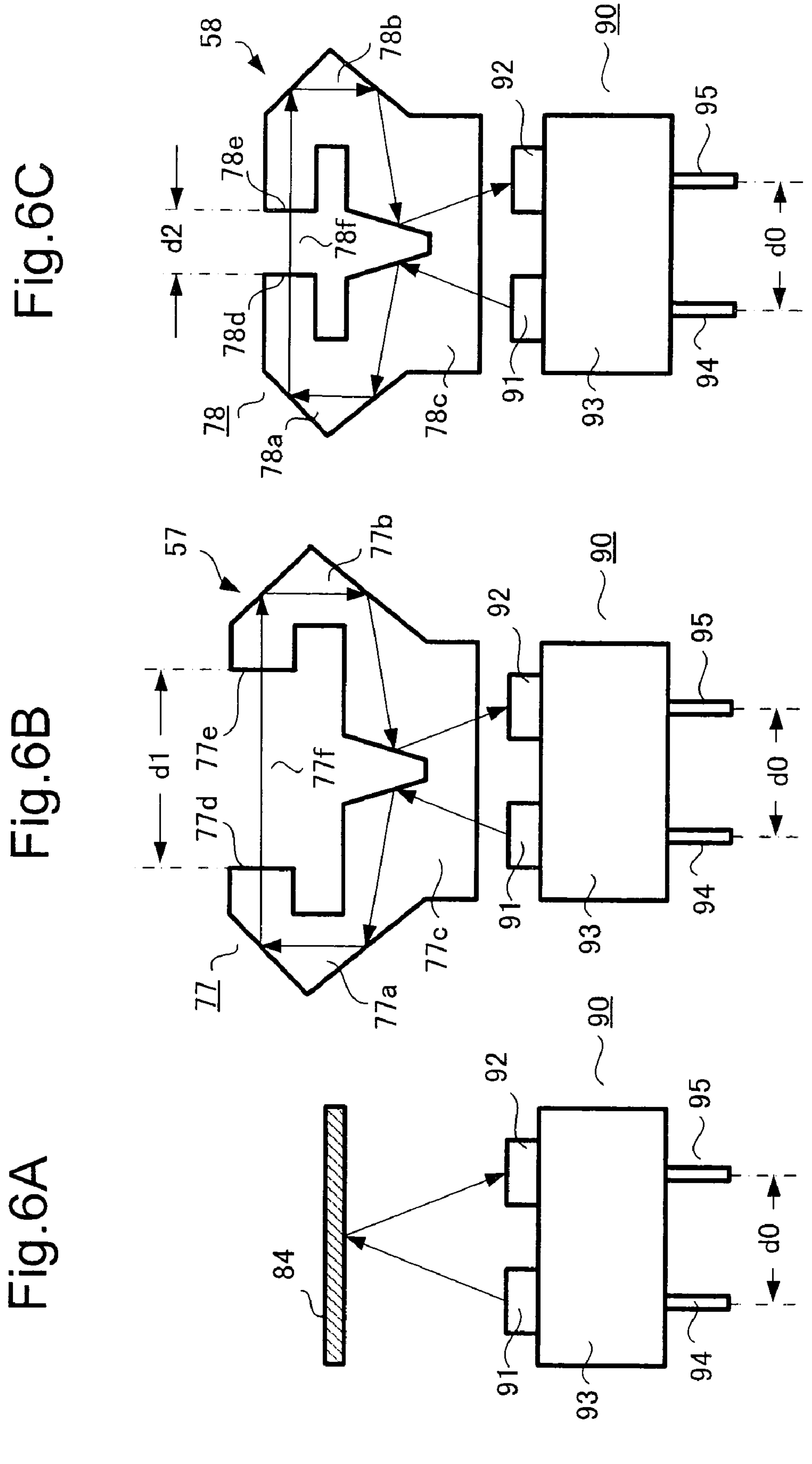
FIGS. 6A, 6B and 6C are front views showing still another embodiment of a photo sensor of the invention.

FIGS. 6A, 6B and 6C are views showing still another embodiment of a photo sensor of the invention, and relate to a reflection type sensor. As shown in FIG. 6A, the reflection type photo sensor uses a photo coupler 90. The photo coupler 90 includes a light emitting element 91, a light receiving element 92 and a light-shielding case 93. The light emitting element 91 and the light receiving element 92 are spaced from each other by a specific interval d0 and are attached in the case 93, a light emitting surface of the light emitting element 91 and a light receiving surface of the light receiving element 92 face one surface of the case 93 at a specified angle, and a terminal 94 of the light emitting element 91 and a terminal 95 of the light receiving element 92 protrude from the other surface of the case 93.

The light emitting element 91 and the light receiving element 92 are symmetrically opposite to each other, an outgoing angle from the light emitting element 91 and an incident angle to the light receiving element 92 are different, the light from the light emitting element 91 is directly irradiated to an object 84 to be detected, and the reflected light is received by the light receiving element 92, so that the presence/absence of the object 84 to be detected can be detected.

FIG. 6B shows a photo sensor 57 using the photo coupler 90. The photo sensor 57 includes the photo coupler 90 and a prism 77. The prism 77 includes a pair of light guides 77*a* 77*b* and a main body 77*c* to couple the light guides 77*a* and 77*b*, and the main body 77*c* is opposite to the light emitting element 91 and the light receiving element 92.

The prism 77 can be coupled to the photo coupler 90, a light emitted in an oblique direction from the light emitting element 91 is reflected plural times at the inner surface of the light guide 91*a*, goes out from an end face 77*d* in the horizontal direction, and is incident on an end face 77*e* of the light guide 77*b*. In the light guide 77*b*, the light received at the end face 77*e* is similarly reflected plural times at the inner surface of the light guide 77*b*, and is guided to the light receiving element 92.

A width d1 of a slit 77*f* formed between the end face 77*d* and the end face 77*e* is set to be a relatively large width. In the case of FIG. 6B, the width d1 of the slit 77*f* is set to be wider than the interval d0.

A photo sensor 58 of FIG. 6B includes a photo coupler 90 and a prism 78. The photo coupler 90 is the same as that of FIG. 6A, and the prism 78 is different in shape.

The prism 78 includes a pair of light guides 78*a* and 78*b* and a main body 78*c* to couple the light guides 78*a* and 78*b*. The prism 78 is smaller than the prism 77 of FIG. 6B in size, and a refraction path of light from a light emitting element 91 to a light receiving element 92 through the light guides 78*a* and 78*b* is similar to that of FIG. 6B. However, refraction angles are slightly different.

A width d2 of a slit 78*f* formed between an end face 78*d* of the light guide 78*a* and an end face 78*e* of the light guide 78*b* is set to be such an interval that an object 82 to be detected can pass through. In the case of FIG. 6C, the width d2 of the slit 78*f* is set to be narrower than the interval d0.

Although the photo sensors 77 and 78 are used for detection of objects to be detected which are different in thickness or size, the photo couplers 90 with the same shape can be used. Besides, the photo coupler 90 can also be used singly as described in FIG. 6A.

As stated above, when the photo sensors of the invention are used, the same photo coupler 60, 90 can be used, and the size of the photo coupler itself can be made small. Further, even if the photo coupler itself is made small, the detection of objects to be detected which are different in detection interval can be performed by replacing the prism. Besides, since the same photo coupler can be used, reduction in cost by use of the common members can also be expected.

Incidentally, with respect to the photo couplers 60 and 90, although the description has been given to the example in which the light emitting element and the light receiving element are integrally attached to the case, the light emitting element and the light receiving element are respectively made independent, and may be attached to a printed board at an equal distance.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An image forming apparatus comprising:

a main body including an image forming unit configured to form an image on a sheet transported through a sheet transport path, a detection unit including first and second photo sensors disposed in the main body and configured to detect movement of moving objects relating to an image forming process, and a control unit configured to control an operation of the moving objects based on a detection result in the detection unit, wherein the first photo sensor includes a first photo coupler having a first light emitting element and a first light receiving element arranged and disposed to be spaced from each other by a first interval, and a first prism coupled to the first photo coupler, the first prism having a first optical path to guide a light from the first light emitting element to the first light receiving element, and provided with a first slit that is wider than the first interval in the first optical path, through which a first object to be detected can pass, and wherein the second photo sensor includes a second photo coupler having a second light emitting element and a second light receiving element arranged and disposed to be spaced from each other by the first interval, and a second prism coupled to the second photo coupler, the second prism having a second optical path to guide a light from the second light emitting element to the second light receiving element, and provided with a second slit that is equal to or narrower than the first interval in the second optical path, through which a second object to be detected can pass.

2. The image forming apparatus according to claim 1, wherein the image forming unit includes a rotation member to perform a rotation movement at a time of image formation, and a replaceable member attachable/detachable to/from the main body, and a rotation state of the rotation member or a mounting state of the replaceable member is detected by causing a part of the rotation member or the replaceable member to pass through the slit of the firs photo sensor.

3. The image forming apparatus according to claim 1, wherein the first and second prisms each have a first light guide and a second light guide that are opposite to each other to form a loop-shaped optical path from the light emitting element to the light receiving element, and the first prism has a loop-shaped optical path of a first length and the second prism has a loop-shaped optical path of a second length that is shorter than the first length.

4. The image forming apparatus according to claim 1, wherein the first and second prisms each have a first light guide and a second light guide that are opposite to each other to form a loop-shaped optical path from the light emitting element to the light receiving element, and a loop diameter of the loop-shaped optical path of the first prism is larger than the first interval, and a loop diameter of the loop-shaped optical path of the second prism is smaller than the loop diameter of the loop-shaped optical path of the first prism.

* * * * *